Jan. 5, 1960 W. E. TURNER 2,919,734
ROTARY DICING MACHINE WITH WATER-LUBRICATED
CUTTING DIES AND EJECTOR
Filed Dec. 5, 1958 2 Sheets-Sheet 1

INVENTOR
WILLIAM E. TURNER
BY Munn & Liddy
ATTORNEYS

Jan. 5, 1960 W. E. TURNER 2,919,734
ROTARY DICING MACHINE WITH WATER-LUBRICATED
CUTTING DIES AND EJECTOR
Filed Dec. 5, 1958 2 Sheets-Sheet 2

INVENTOR
WILLIAM E. TURNER
BY *Munn & Liddy*
ATTORNEYS

Patent 2,919,734

2,919,734
ROTARY DICING MACHINE WITH WATER-LUBRICATED CUTTING DIES AND EJECTOR

William E. Turner, Oroville, Calif., assignor to California Zucca Melon Products, Palermo, Calif., a partnership Application December 5, 1958, Serial No. 778,375

2 Claims. (Cl. 146—78)

The present invention relates to improvements in a rotary dicing machine with water-lubricated cutting dies and ejector. It has particular reference to improvements over the rotary dicing machine shown in United States Patent No. 2,163,878, which was granted to Timothy F. Hornung on June 27, 1939.

In the above-identified patent there is disclosed a hollow cylindrical dicer formed from a plurality of parallel cutting rings which carry a series of longitudinal cutting knives at their peripheries, the rings and knives defining a multiplicity of grid-like dies that are disposed for dicing various types of fruits and vegetables, such as melons. The cutting rings and longitudinal knives define a hollow rotatable cylindrical dicer into which the diced particles of material are fed after passing through the dies. Spokes support the cutting rings and are arranged to form a material ejecting screw within the rotatable dicer.

However, it has been found in the patented machine that the grid-like dies will mash the diced material, at least to a limited extent, when the material is relatively dry, before the diced particles can be forced through and be discharged from the dies by further material being fed to the periphery of the cylindrical dicer.

Accordingly, and as the cardinal object of the present invention, it is proposed to deliver the proper amount of water to the dies and the surfaces of the ejecting screw so that the diced particles will readily slide through the dies and along the ejecting screw, thus preventing the diced particles from being mashed.

Other objects and advantages will appear as the specification proceeds. The novel features of the invention will be pointed out in the claims herewith appended.

Drawings

For a better understanding of the invention, reference should be had to the accompanying drawings, forming part of this specification, in which.

While I have shown only the preferred form of my invention, it should be understood that various changes, or modifications, may be made within the scope of the annexed claims without departing from the spirit thereof.

Detailed description

Figure 3:
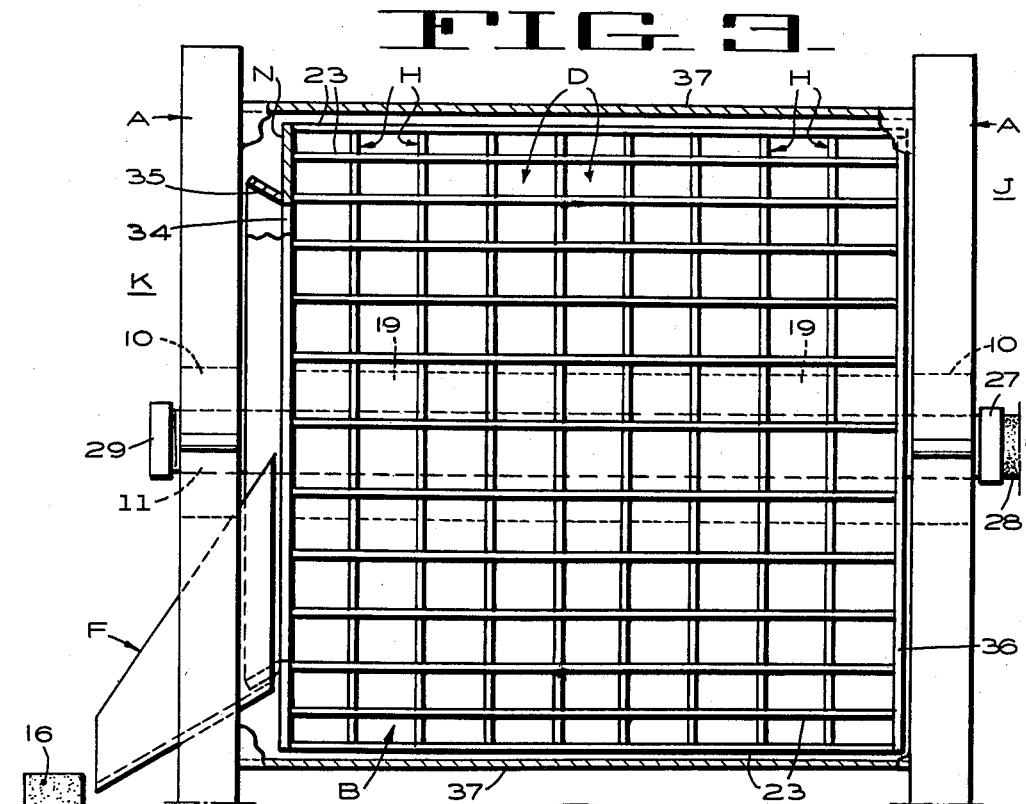
Figure 3 is a longitudinal elevational view, as observed from the plane III—III of Figure 1, parts being shown in section.

Referring to the drawings in detail, it will be noted that a supporting frame indicated generally as A has a hollow cylindrical dicer B rotatably supported therein. As shown in Figure 3, the frame A is provided with bearings 10 in which a pipe shaft 11 is mounted for rotation. The cylindrical dicer B is secured to the pipe shaft 11 so both will turn as a unit.

Figure 1:
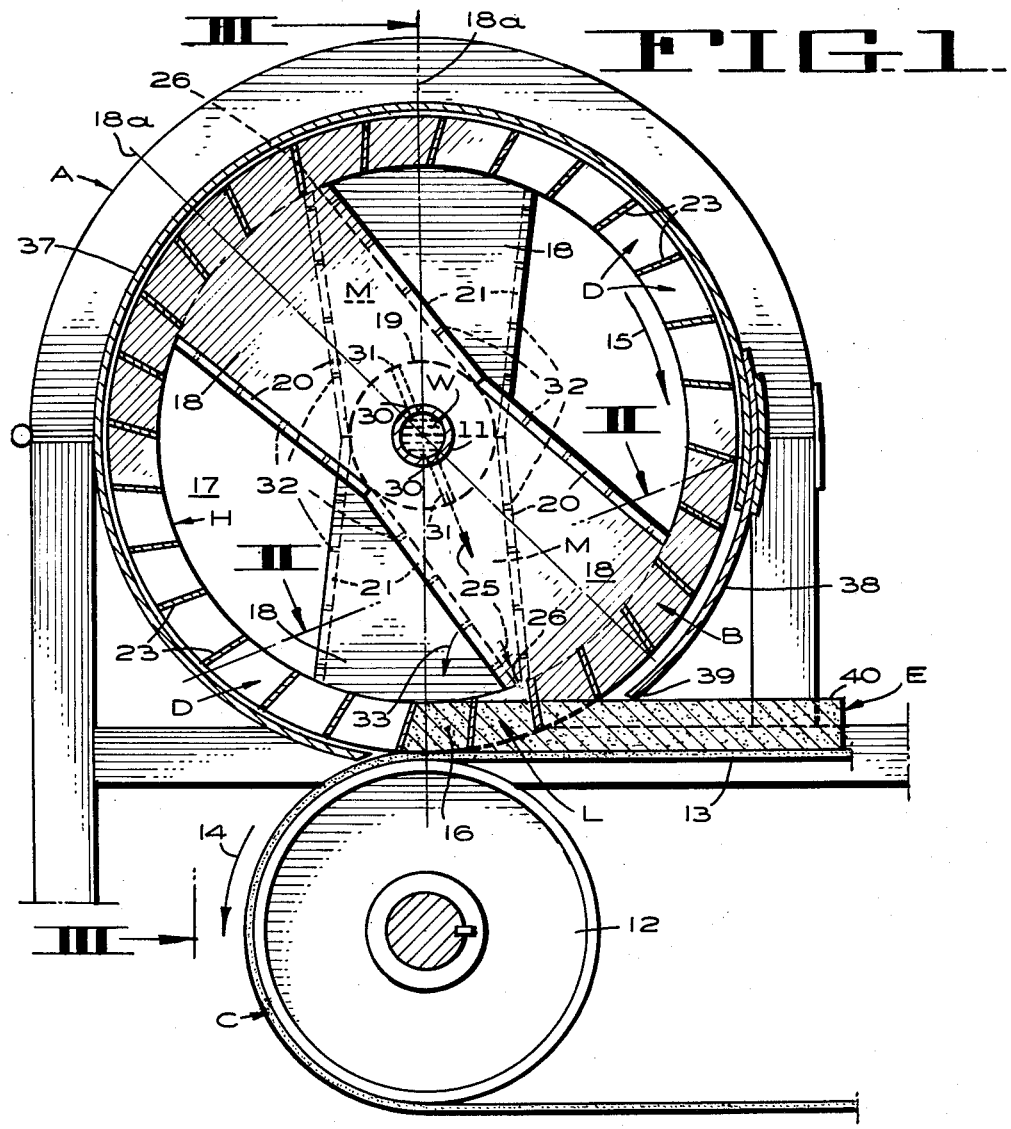
Figure 1 is a transverse sectional view taken through the rotary dicing machine with water-lubricated cutting dies and ejector.

As illustrated in Figure 1, a feed conveyor C passes around a pulley 12 so that the upper reach 13 of this conveyor will be tangent to the lower periphery of the cylindrical dicer B. The latter defines a multiplicity of grid-like cutting dies D which are disposed for dicing material E, the latter being advanced by the upper reach 13 when the pulley 12 is turned in the direction of the arrow 14. The material E may consist of melons, carrots, potatoes, beets, etc. As this material is advanced, it will cause the cylindrical dicer B to be turned in the direction of the arrow 15, and thus the grid-like dies D will cut the material E into a plurality of diced particles 16 (see Figures 1 and 3). The spaces of the dies D communicate with the interior 17 of the dicer B.

It will be noted from Figure 3 that the diced particles 16 cut from the material E are delivered by a discharge chute F so as to fall onto an exit conveyor G. The manner in which the diced particles are moved through the interior 17 of the hollow cylindrical dicer B (see Figures 1 and 2) for dropping into the chute F will be set forth as the specification continues.

The cylindrical dicer B is formed from a plurality of cutting rings H which are arranged in spaced parallel relation with one another and are fixed to the pipe shaft 11. Each of these rings is provided with a spoke 18 extending diametrically thereof (see Figures 1 and 4). Spacers 19 are inserted between the spokes of adjacent pairs of the cutting rings H and are welded or otherwise secured to these spokes.

Figure 2:
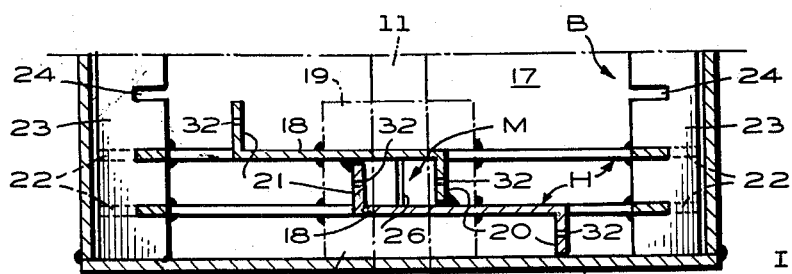
Figure 2 is a fragmentary sectional view taken along the plane II—II of Figure 1.
Figure 4:
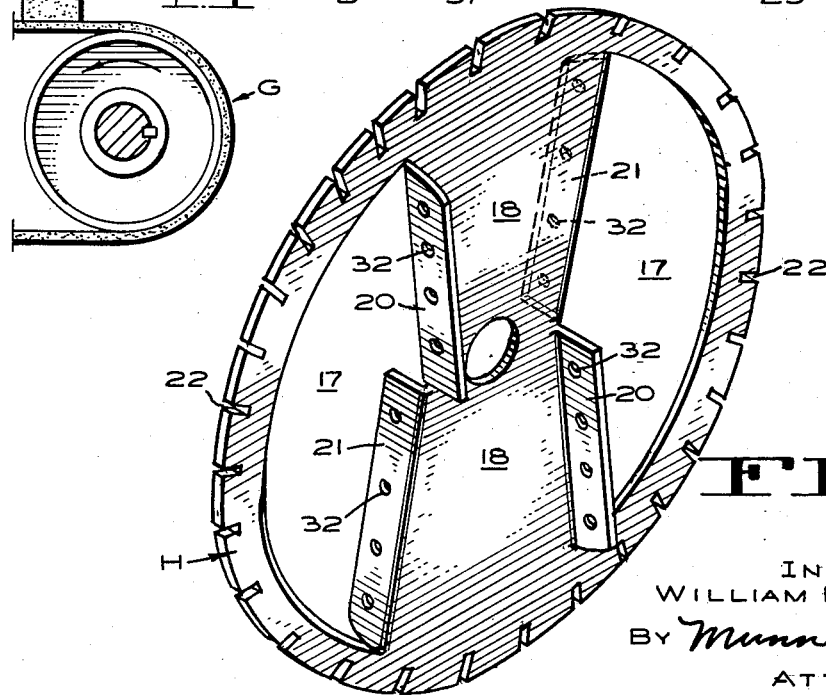
Figure 4 is an isometric view of one of the cutting rings and its spokes.

As clearly disclosed in Figures 1, 2 and 4, the spoke 18 of each ring H is formed with a pair of marginal flanges 20 which project toward the front J of the rotary dicer machine. Also, each spoke 18 is formed with a pair of marginal flanges 21 that project toward the rear K of the dicer machine. The reference characters J and K have been applied to Figure 3 to designate the front and rear, respectively, of the machine, it being noted that the discharge chute F is arranged at the rear of the machine.

It will be apparent from Figure 1 that adjacent cutting rings H are rotated relative to one another so that the axes 18a of the spokes 18 will define an angle therebetween. All of the cutting rings from the front J to the rear K of the machine are arranged so that the axes of adjacent spokes will be angularly related. In other words, the flanges 20 and 21 are disposed in a spiral path around the pipe shaft 11, and thus these flanges will constitute an ejecting screw for moving the diced particles 16 through the interior 17 of the cylindrical dicer B, when the latter is rotated. The diced particles are delivered to the discharge chute F in this manner.

Turning now to Figures 2 and 4, it will be seen that the periphery of each cutting ring H is fashioned with a plurality of slots 22 extending non-radially thereinto. A plurality of longitudinal knives 23 are formed with slots 24 therein (see Figure 2). The knives 23 fit into slots 22 of the rings H, with the slots 24 of the knives 23 sliding over the rings H. The knives 23 are welded or otherwise secured to the rings H, and both coact to provide the multiplicity of grid-like dies D.

It has been found in actual practice that the diced particles 16 will tend to hang up in the dies D, at least to a limited extent, when the material E is relatively dry. As the cylindrical dicer B continues to rotate, due to the material E being advanced between the dicer B and the pulley 12, a second layer of diced particles will be forced into the grid-like dies D. This will result in mashing both layers of the diced particles. For example, the material E may be a slice of melon that is being diced, and the mashing of the diced particles will cause the melon to drip water.

Of course, a relatively dry melon will make a good product, but it is more likely to hang up in the dies D. Choice melons will not bleed or drip water. The sugar content of certain fruits and vegetables will cause the diced particles 16 to hang up in the grid-like dies D during the dicing operation.

In order to overcome the tendency of the diced particles 16 to hang up in the dies D, water W is delivered to the dicing area L at the bottom of the rotary dicer B, as suggested by the arrows 25 in Figure 1. It will be noted from Figures 1 and 2 that a pair of passageways M for the water is provided by the marginal flanges 20 and 21 of adjacent cutting rings H. Each of these water passageways M is substantially triangular in shape, the base of the triangle being about equal to the diameter of one of the spacers 19. The flanges 20 and 21 are spaced a slight distance apart at the apexes of the triangles so as to provide outlet slots 26 through which water will pass to the dicing area L as the cylindrical dicer B is rotated.

For the purpose of delivering water to the passageways M, the pipe shaft 11 is connected by a coupling 27 to a hose 28 (see Figure 3). This coupling is so constructed as to permit the pipe shaft to turn with the cylindrical dicer B, without kinking the hose. The rear end of the pipe shaft 11 is closed by a plug or cap 29. As shown in Figure 1, the pipe shaft 11 has holes 30 formed therein, which communicate with holes 31 fashioned in the spacers 19. This arrangement will allow water W to flow through the passageways M and descend over the surfaces of the dies D in the area L.

Moreover, the flanges 20 and 21 are provided with holes 32 therein which will permit part of the water descending through the passageways M to pass to the exterior surfaces of these flanges, as suggested by the arrow 33 in Figure 1, thereby water-lubricating the exterior surfaces of the flanges 20 and 21 so as to cause the diced particles 16 to slide off these surfaces as the dicer B is rotated.

As previously mentioned, the diced particles 16 are moved toward the rear K of the machine by the ejecting screw defined by the spirally-arranged flanges 20 and 21. It will be noted from Figure 3 that a ring N is secured to the rear ends of the longitudinal knives 23, and this ring has a large opening 34 through which the diced particles 16 may pass so as to drop onto the discharge chute F. An outwardly-flaring conical flange 35 is fixed to the ring N so as to surround the opening 34, and thereby guide the diced particles 16 into the chute F for discharge. The front end of the dicer B has a disc 36 fixed thereto in order to close this end of the cylindrical dicer (see Figures 2 and 3).

In Figures 1 and 3, a curved guard 37 in the shape of a partial cylinder has been shown as being supported by the frame A and partially enclosing the cylindrical dicer B. The purpose of this guard is to prevent the diced particles 16 from being thrown out by centrifugal force as the dicer B is rotated. An adjustable plate 38 is carried by the guard 37 so that its lower end 39 may be positioned adjacent to the upper surface 40 of the material E, as the latter is advanced by the conveyor C.

Although I do not desire to be limited to any particular dimensions, the outlet slots 26 may be 1/32" to 1/64" in width, while the holes 30 in the pipe shaft 11 may be about 1/32" in diameter. These dimensions give good results in actual tests.

It will be apparent that each water passageway M leads to one of the cutting dies D to deliver water thereto, and that each pair of adjacent spokes 18 is provided with a plurality of these water passageways. Moreover, the plurality of water passageways M are arranged in a path extending spirally around the pipe shaft 11 from one end of the cylindrical dicer B to the other.

Summary of operation

Assuming that the material E to be diced consists of a slice of melon, which has been placed on the upper reach 13 of the feed conveyor C, the operation of the machine may be summarized briefly as follows:

As the pulley 12 is turned in the direction of the arrow 14 shown in Figure 1, the advancing material E will be moved into engagement with the hollow cylindrical dicer B. As the material E continues to advance, it will cause the dicer B to rotate in the direction of the arrow 15. The grid-like dies D, which are defined by the cutting rings H and the longitudinal knives 23, will dice the material into particles 16.

During the meantime, water W will flow through the holes 30 and 31 in the pipe shaft 11 and spaces 19, respectively, and will descend through the triangular-shaped passageways M, which are defined by the marginal flanges 20 and 21. Part of the water will flow through the outlet slots 26 at the apexes of the triangles and will spread over the surfaces of the grid-like dies D at the lower portion of the cylindrical dicer B. This water will lubricate the cutting rings H and the longitudinal knives 23. Thus the diced particles may be pushed upwardly through the lower dies D, as a second layer of diced particles 16 are being cut by these dies. The diced particles 16 will be ejected from the grid-like dies D without being mashed or crushed.

Moreover, part of the water W descending in the passageways M will flow through the holes 32 in the marginal flanges 20 and 21, and will water-lubricate the exterior surfaces of these flanges. Thus the diced particles 16 will slide off the exterior surfaces of the flanges 20 and 21 with ease. As the cylindrical dicer B continues to rotate, the ejector screw provided by the spirally-staggered flanges 20 and 21 will move the diced particles 16 toward the rear K of the machine.

Here, the diced particles will move through the large opening 34 of the ring N, and will be guided by the conical flange 35 into the chute F for discharge onto the exit conveyor G, all without rupturing the cells of the melon being diced. Obviously, other vegetables and fruits may be diced with the machine.

After the cylindrical dicer B has made one complete revolution, all of the cutting dies D will be filled with diced particles. The water issuing from the outlet slots 26 and the holes 32 will be sufficient to flow around the interior of the cylindrical dicer B so as to deliver a film of water over all of the cutting dies D. It will be apparent from Figure 1 that some of the water dropping through the holes 32 will drop into the lowermost group of cutting dies D.

I claim:

1. In a rotary dicing machine: a hollow cylindrical dicer having a plurality of cutting rings arranged in parallel order and being spaced from each other; the cylindrical dicer further having a plurality of longitudinal knives carried by the peripheral portions of the cutting rings and coacting therewith to define a multiplicity of cutting dies, the latter being operable for dicing material into particles when this material is advanced tangentially to the periphery of the cylindrical dicer; each die having a space communicating with the interior of the cylindrical dicer through which the diced particles may move; each cutting ring having a supporting spoke on the interior of the cylindrical dicer; a supporting shaft extending through all of the spokes and defining an axis about which the cylindrical dicer may be rotated; each spoke being provided with at least a pair of flanges that extends along the length thereof, with the flanges projecting into abutting relation with the spokes of adjacent cutting rings; the flanges on adjacent spokes coacting with each other and with their respective spokes to define substantially triangular-shaped water passageways; means for delivering water to these passageways; the apexes of the triangles being disposed adjacent to the cutting dies; the flanges of each passageway being spaced a slight distance apart at the apex of the triangle, thus providing an outlet slot through which water may be discharged over the surfaces of the cutting dies to water-lubricate these dies and facilitate the movement of the diced particles through the cutting dies, as the cylindrical dicer is rotated.

2. The rotary dicing machine, as set forth in claim 1; and in which the flanges have exterior surfaces over which the diced particles may slide, after moving into the interior of the hollow cylindrical dicer; the flanges being fashioned with holes extending therethrough, whereby part of the water in the passageways will flow to said exterior surfaces of the flanges to water-lubricate said surfaces, and facilitate the sliding of the diced particles thereover.

References Cited in the file of this patent

UNITED STATES PATENTS

| | | |
|---|---|---|
| 1,085,068 | Swanson | Jan. 20, 1914 |
| 1,408,978 | Brenner | Mar. 7, 1922 |
| 1,944,577 | Rose | Jan. 23, 1934 |
| 2,163,878 | Hornung | June 27, 1939 |
| 2,375,231 | Kottmann | May 8, 1945 |